May 28, 1963

H. C. STAEHLE 3,091,047

LAMINATED RECORD CARD

Filed Jan. 3, 1961

HENRY C. STAEHLE
INVENTOR.

BY R. Frank Smith
Lloyd F. Seebach
ATTORNEY & AGENT

3,091,047
LAMINATED RECORD CARD

Henry C. Staehle, Rochester, N.Y., assignor to Eastman Kodak Company, Rochester, N.Y., a corporation of New Jersey Filed Jan. 3, 1961, Ser. No. 80,211
1 Claim. (Cl. 40—158)

This invention relates to record cards for card classification and tabulating systems and more particularly to a laminated record card making possible an improved mounting of microfilm and the like in apertures in such cards.

Heretofore, microfilms and other transparencies have been mounted in apertures in record cards by adhesive methods such as adhesive tapes or glues bonding the insert to the record card. Some of these prior mounts have required costly and complex machinery for making such adhesive joints, and some of the bonds obtained have been weak or have left projections extending beyond the face surfaces of the record card so that the mounting was liable to be damaged during handling.

An object of this invention is to provide means for obtaining a stronger bond between the film insert and the record card so that the card may withstand extensive handling without damage to the film insert.

Another object of the invention is to provide a record card allowing a simpler and more economical mounting of a microfilm in an aperture without using adhesive tapes, adhesives, or projections extending beyond the face surface of the record card.

Still another object of this invention is to provide a record card having better handling characteristics, such as greater strength, greater resistance to tearing, and greater ability to retain a flat shape and resist curling, bending, or wrinkling, such characteristics being desirable in a record card.

Other objects and advantages of the invention will be apparent during the course of the following description.

This invention comprises a record card formed of a plurality of laminae at least one of which is a lamina of photographic film base. Within an aperture formed in such a card a microfilm insert or the like may be mounted by using a solvent to induce a coalescent weld between the film insert and the lamina of photographic film base.

The invention will more fully appear from the following description of the drawings.

The improved record card illustrated herein is one adapted for card classification systems including Hollerith or IBM cards and other types of cards for recording, storing, or processing data. The feature distinguishing this record card from prior cards is a lamina or layer of photographic film base united with another suitable layer or layers, with the result that a microfilm or the like adapted for mounting in an aperture formed in such a card may be coalescently welded to the photographic film base lamina by means of a solvent capable of dissolving the abutting peripheries of both the microfilm insert and the photographic film base lamina.

Figures 1, 2:
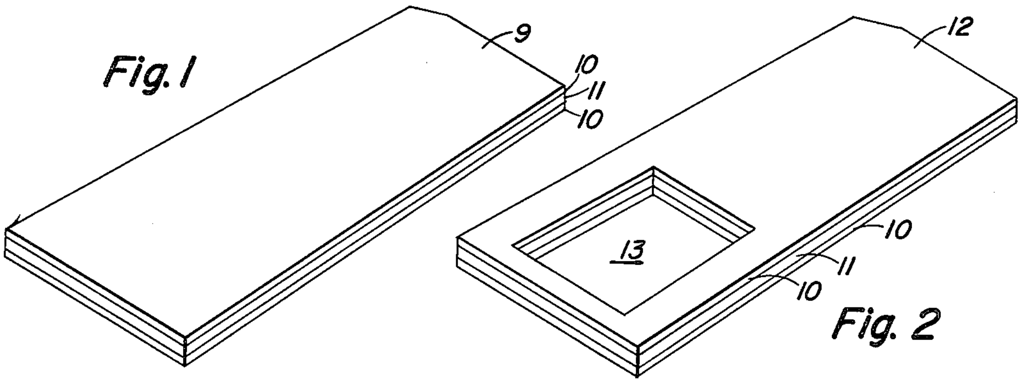
FIG. 1 is a view of a record card composed of laminae.
FIG. 2 is a view of a laminated record card having an aperture in which a film insert may be mounted.

In the embodiment shown in FIGS. 1 and 2, the record card is formed of three laminae, the center lamina 11 being a photographic film base. The layers 10 other than the photographic film base lamina 11 can be formed of any suitable material. Considering that record cards can contain printed or typewritten information and can be punched with coded data, paper is satisfactory for such laminae. But other material, for example, a magnetizable lamina can be used.

The card can be formed without an aperture, as shown in FIG. 1, and with such a card an aperture can be die cut at some later time. One satisfactory method is to die cut in a single operation both an aperture in the card and a frame of microfilm for insertion in the aperture. Of course, the film insert and the aperture also could be die cut separately. Another method would be to die cut apertures in all of the laminae and assemble them so that the apertures lie in mutual registration, as illustrated at 13 in FIG. 2.

Figures 6, 7:
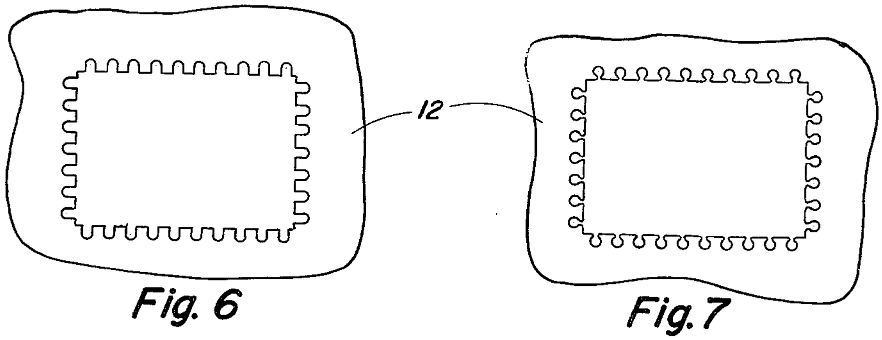
FIG. 6 is a partial plan view of a record card provided with an aperture having an irregular periphery.
FIG. 7 is a partial plan view of a record card provided with an aperture having a notched periphery which is complementary to the periphery of a film insert for providing an interlock between the card and film.

Apertures can be formed of any size or shape desired, but irregular peripheries offer more area for coalescence and produce a stronger weld and, as to that property, are preferred over straight-edged peripheral abutments. FIG. 6 shows one of many possibilities for an irregular periphery, and FIG. 7 shows an aperture periphery which provides an interlock with a film insert having a corresponding periphery. Apertures may also be serrated, notched, wavy, or dovetailed. Film inserts can be formed with peripheries corresponding in abutting relation with irregular peripheries. One method is to die cut the film insert with the same die used for cutting the aperture. As the total length of such peripheries is increased, the coalescent weld between the lamina and the film insert is also increased, and a dovetailed or an interlocking relation, such as shown in FIG. 7, therefore, offers even more strength.

Figure 3:
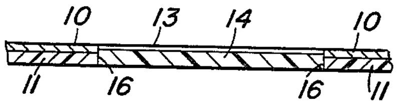
FIG. 3 is a partial sectional view of a two-ply record card having a film insert mounted within an aperture.
Figure 5:
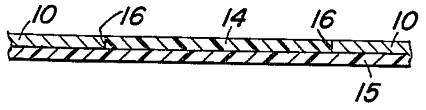
FIG. 5 is a partial sectional view of a two-ply record card having a transparent lamina of photographic film base, and having a film insert mounted in an aperture in another lamina.

Many combinations of laminae are possible. Two-ply cards are illustrated in FIGS. 3 and 5. In FIG. 3, within an aperture 13 formed through both the paper lamina 10 and the photographic film base lamina 11, a film insert 14 is shown welded to the photographic film base lamina 11 at their juncture 16.

In FIG. 5, the photographic film base lamina 15 must be substantially transparent so that light can pass through the film insert 14 when it is mounted in an aperture in the paper lamina 10. Such a mounting can be made by depositing solvent on the photographic film base lamina 15 near the periphery 16 of the aperture in the paper lamina 10. Care must be used to keep the solvent near the periphery 16 so as to affect only the margin of the film insert 14 and not the image portion of the film. In this case the paper must be substantially of the same thickness as the film insert. A similar mounting could be obtained with the addition of a paper lamina (not shown) on the bottom side of the photographic film base lamina 15, provided that an aperture in such a paper lamina lies in registration with the aperture in the lamina 10 on the opposite side of the photographic film base lamina 15.

Figure 4:
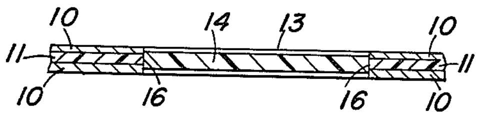
FIG. 4 is a partial sectional view of a three-ply record card having a film insert mounted in an aperture.

Three-ply cards are illustrated in FIGS. 1, 2, and 4. In FIG. 4 within an aperture 13 formed through all laminae, a film insert 14 is shown welded to the photographic film base lamina 11 at their juncture 16. Two outer laminae of paper 10 allow writing on both sides of the card and ensure that the film insert 14 is mounted in a recessed relation to both face surfaces of the card.

This embodiment is preferred for many purposes in that such a mounting is not likely to be damaged during handling of the card.

A record card can also comprise more than three laminae, and the photographic film base lamina can be an outer or inner layer in any combination of laminae.

If laminae of proper thicknesses and shapes are selected, a laminated card can have substantially the same dimensions as ordinary record cards and thus be adaptable for use in present data processing systems. For example, the standard thickness of an IBM card is approximately .007". By selecting a suitable grade of paper of approximately .002" thickness and laminating two layers of such a paper on opposite sides of a sheet of photographic film base of approximately .003" thickness, a card can be formed which is substantially the same thickness as a standard IBM card.

Methods of laminating are well known, and various cements and adhesives are available for such purposes. One such adhesive is an acrylic resin dispersion known as "Rhoplex FRN."

Besides adhering laminae together to form a card, a photographic film base material could be coated or sprayed upon a suitable foundation paper in order to form a laminated card.

The photographic film base lamina can be selected from among several materials depending upon the composition of film insert to be mounted, and the solvent to be used for the weld. Various cellulose ester films are satisfactory, including cellulose acetate, acetate propionate, or acetate butyrate. Other materials such as polyethylene terephthalate can also be used for mounting certain types of film inserts.

Coalescence or welding of the film insert with the photographic film base lamina of the record card is accomplished by means of a solvent. Methods and solvents for producing such a weld are well known in the art and have long been used for splicing photographic film. An appropriate solvent placed at the juncture of the abutting peripheries of the film insert and the aperture in the photographic film base lamina causes partial dissolution of the two films, and after drying leaves them coalesced. Suitable solvents depend upon the chemical composition of the film insert and photographic film base laminae that are to be joined. For a typical microfilm insert and a cellulose ester lamina, satisfactory solvents include chloroform, dichloromethane, and acetone. Other solvents are also capable of dissolving the edges of the film insert and the film lamina and forming the weld contemplated by this invention, depending upon temperatures, conditions, and compositions of the films involved.

The invention has been described in detail with particular reference to preferred embodiments thereof, but it will be understood that variations and modifications can be effected within the spirit and scope of the invention as described hereinabove and as defined in the appended claim.

I claim:

As an article of manufacture, a record card or the like comprising a plurality of united laminae having respective apertures in mutual registration, at least one of said laminae being formed of a photographic film base, said record card including a microfilm or the like positioned within said aperture and having a periphery configured substantially the same as said aperture periphery and formed so as to provide an interlocking abutting relation between said aperture periphery and said microfilm periphery, said microfilm being coalescently united to said film-base lamina.

References Cited in the file of this patent

UNITED STATES PATENTS

| | | |
|---|---|---|
| 2,165,250 | George | July 11, 1939 |
| 2,533,474 | Koch | Dec. 12, 1950 |
| 2,612,711 | Baker | Oct. 7, 1952 |
| 2,635,654 | Roetger | Apr. 7, 1953 |
| 2,690,021 | Langan | Sept. 28, 1954 |
| 2,819,656 | Patterson | Jan. 14, 1958 |
| 2,859,550 | Langan | Nov. 11, 1958 |
| 2,875,672 | Cross | Mar. 3, 1959 |
| 2,951,304 | Herte | Sept. 6, 1960 |